3,001,878
STABILIZER FOR EDIBLE FATS
Alexander W. Williams, Syracuse, Richard H. Beckman, Arcade, and Donald E. Mook, Dewitt, N.Y., assignors to The Borden Company, a corporation of New Jersey
Filed July 3, 1959, Ser. No. 825,395
10 Claims. (Cl. 99—163)

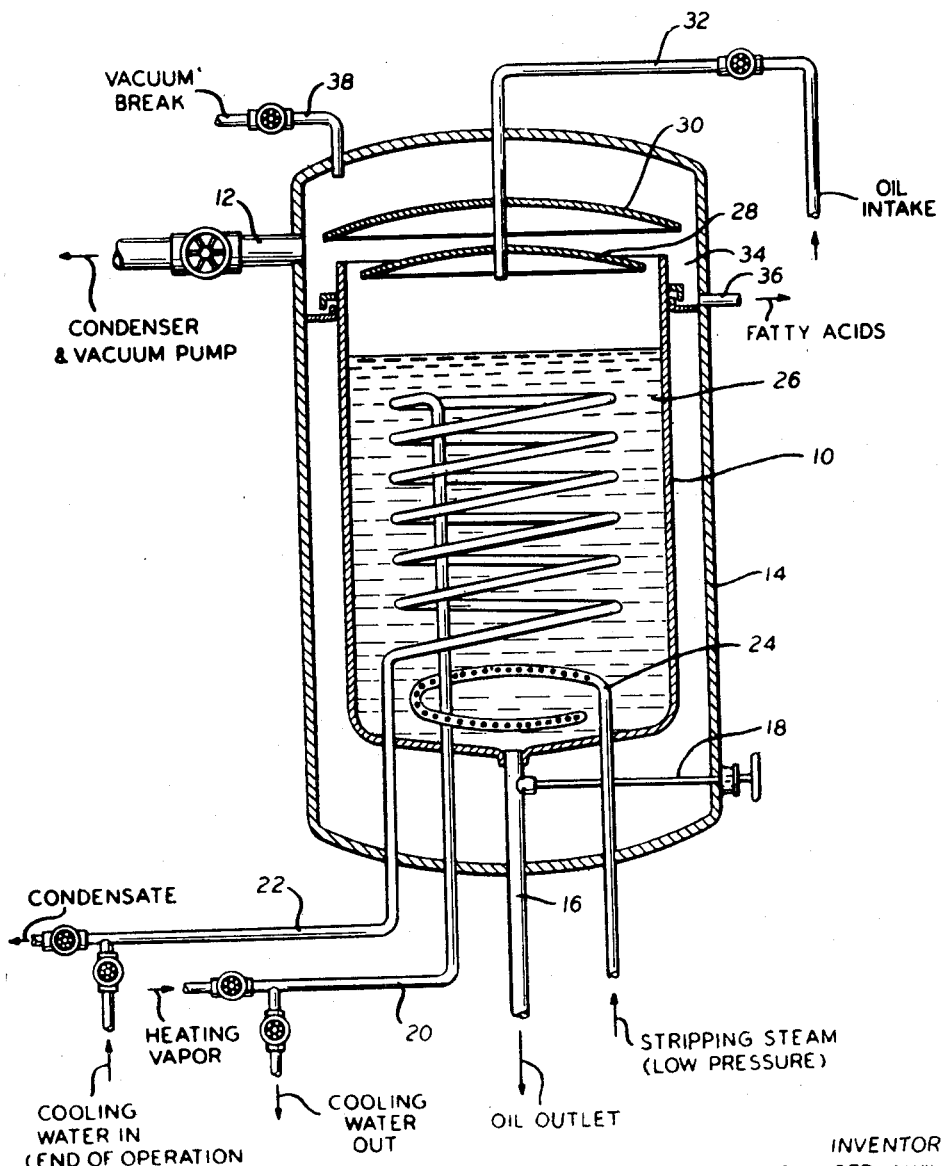

This invention relates to a process and product for improving the flavor of edible fatty glycerides and their stability on storage.

The application is a continuation-in-part of application Serial No. 774,354, filed by us on November 17, 1958.

Briefly stated, the invention comprises heating a protein or derivative obtainable therefrom by hydrolysis in contact with a sugar and with a fat in liquid condition until a reaction product results that is soluble in the liquid fat and as formed dissolves in part at least therein and away from unreacted protein and sugar which are insoluble in the fat and will remain in a solid phase or phases. The solution so formed, suitably after filtration, is useful as a stabilized fat composition or as an additive to stabilize additional quantities of fat against undesirable changes during storage or shelving before use.

The invention, in one embodiment comprises the herein described heat stripping of the fat, to improve the flavor characteristics, before the sugar and protein are introduced.

The invention is particularly useful in making a spray dried whole milk powder of good keeping qualities or a "filled" milk powder in which another fat, such as fat of relatively high degree of unsaturation at present considered to provide special benefits in human nutrition, is substituted for butter fat in the whole milk powder.

Best results are obtained when the heating and stripping are effected in vacuo and the charge being heated contains an admixed chelating agent for bi- and other polyvalent metals.

The results with butter fat illustrate our improvement. The butter fat mixed with skim milk powder, heated under the said stripping conditions, and then reconstituted into a whole milk powder has remained substantially stable in flavor and without objectionable oxidation at ordinary temperatures for periods of more than six months up to the present. Whole milk powder that is comparable except for containing usual butter fat without our stabilizing treatment develops an objectionable off flavor at such temperature in a few weeks.

The fats used by us are the fatty glycerides of which butter fat is the preferred example. The fat selected is a liquid, at elevated temperatures at least, so that it will dissolve the product of the protein and sugar reaction and remove the product, as formed, from the sphere of reaction and into a dilute solution in the fat. We use also and obtain satisfactory results from various fats having economic advantages and, in some cases, also a relatively high proportion of unsaturates. Such other fats that we use include coconut, peanut, soybean, corn, safflower, cottonseed, sunflower, linseed or like edible vegetable or animal glyceride fats, either winterized before use or not. The fats may be used separately or in mixtures with each other. When linseed oil is used, for instance, it may be and suitably is blended with one or more of the less unsaturated fats, to reduce the content of unsaturated acids in the finished, treated glyceride mixture.

The figure of the drawing is a side elevation of suitable apparatus for effecting the heating and stripping, parts not shown or described being conventional.

Tank 10 is in communication with a condenser and vacuum pump of usual kind through line 12, disposed in an air chamber within the shell or enclosure 14, provided with draw-off line 16 with valve 18, and heated by vapor of any convenient kind such as pressure steam or by heated oil such as o-dichlorobenzene or the eutectic mixture of diphenyl oxide and diphenyl supplied through line 20 with return line 22 for condensed steam or for the oil to be reheated.

The sparger 24 for supplying the stripping steam or an inert gas is located near the bottom of the charge of fat 26 in the tank. Baffle plate 28 is disposed above the oil and drip plate 30 above the baffle. The fat intake line 32 delivers the fat at a position below plate 28. An annular recess 34 extends around the inside of shell 14, between the tank 10 and the outer shell 14 at such position that any backdrip, which forms or falls on the plate 30 or on the inside of said enclosure above the annular space 34, is withdrawn through the outlet 36.

The vacuum break line 38, attached to a supply of inert gas, restores the pressure to normal when an additional material is to be introduced or at the conclusion of the treatment of the batch of fat.

The fat intake line 32 serves also to introduce the sugar and protein mixture. This mixture before introduction is suspended to advantage in a portion of the processed fat drawn off through line 16. The suspension is maintained under an atmosphere of inert gas and either drawn in by vacuum or pumped in through the line 32.

As the protein, we use ordinarily milk protein although we may use soy protein, gelatin, casein, lactalbumen, egg albumin, peanut protein, or the like or mixtures thereof. Hydrolysis products of the proteins, particularly the amino acids, may be used but are unnecessary when the mixed protein and selected sugar are heated as described in contact with the fat.

As the sugar we ordinarily use the sugar associated naturally with the protein such as the lactose in a skim milk powder. Examples of other sugars that we use are maltose, dextrose, and levulose. The protein and sugar mixture is introduced dry into the fat to be processed and intimately suspended therein at a temperature above the melting point of the selected fat and suitably at about 350°–450° F. under a non-oxidizing atmosphere.

A suitable chelating agent is any non-toxic, oil-insoluble sequestering agent or scavenger for metal ions. Citric acid is preferred for our purpose. We can use, however, tartaric or gluconic acid and any alkali metal polyphosphate sequestering agent, as for instance, sodium hexametaphosphate and pyrophosphate.

Proportions that are permissible in making a stabilizer to be blended with an additional large amount of fat and those that are recommended commercially for this purpose are shown in the following table. Wide variations are possible because the process is useful either in stabilizing the fatty glyceride that is heated with the protein and sugar mixture or in making a concentrated stabilizer that may be mixed with additional very large proportions of fat.

| Component Used | Parts by weight for 100 of Fat | |
|---|---|---|
| | Permissible Range | Recommended For Commercial Use |
| Protein | 0.2–25 | 5–20 |
| Sugar | 0.2–50 | 8–30 |
| Chelating agent | 0–5 | 0.05–1 |

When the product resulting from the processing as described is not to be used as a stabilizer for additional fat, by simple mixture therewith, the proportions of the protein and sugar used are reduced as to 0.2–8 parts and 0.2–12 and ordinarily to 0.3–4 and 0.5–8, respectively. The amount of the additional fat to be stabilized may be 100–1,000 parts or somewhat more for 10 parts of the fat heated in the stabilizer production.

The proportion of sugar to protein in the sugar-protein mixture used is about 0.2–5 parts of sugar to 1 of the protein. We use ordinarily 0.5–2 parts of the sugar to 1 of protein.

We effect the stripping at a temperature within the range about 300°–500° F. as at 350°–450° F., and ordinarily at an absolute pressure corresponding to about 1–20 mm. of mercury and suitably at 1–7 mm.

The temperature is maintained in the mixture undergoing sparging, as by steam at the necessary pressure in coil 20 or by circulation of a heated oil, the eutectic mixture of diphenyl oxide and diphenyl, or the like. The stripping is continued until substantially all free fatty acid or other materials volatilizable under the conditions of stripping have been removed, this being the condition in representative runs when about 0.1%–1% of the weight of the fat has been distilled, the exact proportion of volatiles varying somewhat with the fat being processed. Volatilizable materials produced in the heating are removed under the influence of the vacuum as formed. The fat remaining as the still residue, when no sugar and protein have been introduced, is very unstable but is improved in flavor.

When the stabilizer is to be manufactured, the skim milk solids or other protein and sugar mixture is introduced into the fat from which the volatilizables have been stripped, the introduction being made into the hot oil with exclusion of air. The heating in vacuo is resumed, as at 300°–500° F., until the sugar in part at least is charred and reacted with the protein. This requires about 5–30 minutes, 15 minutes usually being adequate. We obtain improved results when the said mixture is introduced into the hot fat when the period of stripping the fat is nearly over, such as 15 minutes before the end.

The steam sparging acts as an effective agitator so that all of the materials in the still are maintained in intimate contact, with the solids in suspension in the liquid, during the stripping and also during the production of the stabilizer.

While various explanations may be advanced to explain the mechanism by which such results are obtained, we consider that the fatty oil in which the solid reactants, protein and sugar, are suspended, dissolves away and dilutes the reaction product as formed, so as to prevent further undesirable reaction thereof.

The invention will be further illustrated by description in connection with the following specific examples. In these examples and elsewhere herein, proportions are expressed as parts by weight unless specifically stated to the contrary.

*Example 1*

A flavor stabilizing agent and antioxidant in concentrated form, for use in fat-containing milk products and other fatty glycerides, is prepared by first steam stripping butter fat as described at about 400° F. and a pressure of approximately 5 mm. of mercury absolute, with about 1 lb. of steam sparged into the bottom of the still per hour for every 35 lbs. of fat in the still, the stripping being continued for 3 hours. The vacuum system is maintained throughout the stripping period and the vapors and volatilizables from the oil are continuously removed from the still by the vacuum.

While the charge is at 400° F., the vacuum is then broken by admission of nitrogen, the stream of steam is discontinued, and 25% of skim milk solids, based on the weight of butter fat, are added under a nitrogen atmosphere to the still residue. The vacuum is restored and introduction of steam resumed. A temperature of charring, such as 400° F., and 2 mm. of mercury absolute pressure are maintained for 10 to 15 minutes, the whole then cooled to 120° F., the vacuum released by introducing an inert gas (here nitrogen), and the fat filtered to remove the oil-insoluble products of the charred milk solids present.

There is no aqueous liquid phase in the system during the heating and the reaction is essentially dry.

In use of the filtrate as stabilizer for additional fats, 1 lb. of the filtrate is mixed with about 10–100 lbs. of additional butter fat, margarine, fat-containing baby foods, a fat-containing candy such as caramel, or other edible fat-containing material.

Butter fat, with the stabilizer filtrate added in the proportion of 1 lb. to 25 lbs. of the fat, was homogenized with skim milk solids in aqueous dispersion in proportion to establish the fat content within the range for whole milk, such as 28% of the weight of total solids. The homogenized mixture was spray dried to a whole milk powder. The powder remained stable, as to both flavor and resistance to objectionable oxidation, when stored for 6 months to date, although slightly more than $25/26$ of the total fat present had not been heated in contact with the protein and sugar.

*Example 2*

The procedure and composition of Example 1 are used except that the amount of the skim milk solids introduced is 0.5% of the weight of the fat.

The product, after the filtering step, to remove the charred and other fat-insoluble material, is used directly as a source of stabilized fat for the homogenization in making the reconstituted milk to be spray dried.

*Example 3*

One hundred parts of refined palm oil and 0.75 part of citric acid, as chelating agent for metal ions, were introduced into the still with oil heat, means for evacuation, and the sparger for live steam in the bottom of the still. The charge was heated to 392° F. and the absolute pressure lowered by evacuation to 3–5 mm. of mercury over a 30 minute period.

The temperature and pressure were then maintained approximately steady and steam was introduced through the sparger at the pressure of 5 p.s.i. during the heating period and then at 25 p.s.i. for a subsequent, stripping period of 45 minutes.

The stripping steam was next shut off, the heating discontinued, the vacuum broken by the admission of nitrogen as a non-oxidizing gas, and 0.5 part of skim milk powder then introduced. The vacuum was now reestablished and the heating and steam sparging resumed as before, the milk powder becoming thus quickly suspended in the hot, nearly completely stripped palm oil. The heating was continued for 30 minutes at the 3–5 mm. pressure and temperature of about 392° F.

Then the heating and steaming were finally discontinued, the whole cooled to 140° F., and the vacuum on the cooled material broken with nitrogen. The kettle was then opened. It was found that the milk powder had charred. The lactose and the protein therein had in part reacted in manner understood to involve oxygen in the lactose and hydrogen atoms attached to nitrogens in the protein, with elimination of water. Volatilizable decomposition products of the charring and reaction had been removed by the vacuum as formed.

Charred and other fat-insoluble materials including any remaining milk powder, were separated by filtration, this term including separation of the phases without change of state, as by filtration in a pressure (or vacuum) filter or in a centrifuge with a retaining wire cloth. In this example, the filtration was through a filter cloth. The filtered stabilized palm oil was collected in a tank under an atmosphere of carbon dioxide.

The filtrate was made into a filled milk product by reconstitution with milk-solids-not-fat in proportion required to provide the legal fat content for milk (3.5%–4%) or cream. The filled reconstituted and then spray dried milk was stable on storage of the powder.

Example 4

The procedure and composition of either of the Examples 1 or 2 are used except that the butter fat there used is replaced by an equal weight of any of the following fatty glycerides or a mixture of two or more of them: coconut, peanut, soybean, corn, safflower, cottonseed, sunflower, and linseed oils.

Example 5

The procedure and composition of any of the Examples 1, 2 and 4 are used except that any of the chelating agents disclosed herein are mixed with the selected fatty glyceride, before the stripping thereof, in the proportion of about 0.5%–1% of the chelating agent on weight of the said glyceride.

Example 6

The procedure and composition of either of the Examples 1 or 2 are used except that the milk-solids-not-fat are replaced by an equal weight of a mixture of any protein disclosed herein with any sugar disclosed in the proportion of 0.5–3 parts of the sugar for 1 of the protein.

Example 7

The procedure and composition of Example 1 are used except that the vacuum is omitted and the materials at all times during making the stabilizer are maintained in an oxygen-free atmosphere, as under nitrogen. The stabilizer so made is limited in its use because of its off-flavor.

It will be understood that it is intended to cover all changes and modifications of the examples of the invention herein chosen for the purpose of illustration which do not constitute departures from the spirit and scope of the invention.

We claim:

1. In making a stabilizer for fats, the process which comprises forming a dry mixture of 0.2–25 parts by weight of protein, 0.2–50 parts of sugar and 100 parts of a fatty glyceride, heating the mixture so formed in vacuo at about 300°–500° F. and in a current of steam, so as to remove heat volatilizable materials and cause charring of the said mixture and forming a fat soluble reaction product, the said product as formed dissolving in part at least in the fatty glyceride, and then filtering the resulting solution of the stabilizer in the said glyceride away from remaining fat-insoluble material.

2. The process of claim 1, the said protein and sugar being in the form of skim milk powder and the said fatty glyceride being butter fat.

3. The process of claim 1, the proportion of the sugar used being at least approximately 0.5–3 parts by weight for 1 part of the protein.

4. A stabilizing agent for edible fatty glycerides comprising a solution of the stabilizer in a liquid fatty glyceride and being the product of heating 0.2–25 parts by weight of a protein and 0.2–50 parts of a sugar in suspension in 100 parts of a fatty glyceride in vacuo in a stream of steam and at a temperature of about 300°–500° F. until reaction and carbonization occur in the said suspension, removing volatilizable products as formed, and then separating the resulting liquid phase including the stabilizer in solution in the glyceride from remaining fat-insoluble material mixed therewith.

5. The flavor stabilizing agent of claim 4, the protein used being selected from the group consisting of milk protein, soy protein, gelatin, casein, lactalbumin, egg albumin and peanut protein.

6. The process of claim 1, the said sugar being lactose.

7. The process of claim 1, the said protein being selected from the group consisting of milk protein, soy protein, gelatin, casein, lactalbumin, egg albumin and peanut protein.

8. In improving the flavor keeping qualities of an edible fatty glyceride, the process which comprises heating the fatty glyceride at about 300°–500° F. in vacuo and in a current of steam until substantially no further loss of volatilizable material occurs, then suspending in the fatty glyceride under non-oxidizing conditions a blend of a protein and a sugar containing about 0.2–25 parts by weight of the protein and 0.2–50 parts of the sugar for 100 parts of the fatty glyceride, heating the resulting suspension at about 300°–500° F. in vacuo and in a current of steam, until the said blend is charred in part at least and a reaction product results that is soluble in the fatty glyceride, and then cooling and filtering the resulting glyceride solution of the said product to obtain a filtered fatty glyceride of improved flavor stability, the said filtering being effected at a temperature above the melting point of the fatty glyceride.

9. The process of claim 8, the said blend of protein and sugar being skim milk powder and the said fatty glyceride being butter fat.

10. The process of claim 1 which comprises admixing a non-toxic chelating agent for iron and like metal into the fatty glyceride, in the proportion of about 0.05–5 parts of the said agent for 100 parts of the fatty glyceride, before the said heating of the fatty glyceride.

No references cited.